(12) United States Patent
Nakada et al.

(10) Patent No.: US 6,383,328 B1
(45) Date of Patent: May 7, 2002

(54) PROCESS FOR PRODUCING DECORATED ARTICLE

(75) Inventors: Seizi Nakada; Senji Suzuki; Shinjiro Kawaguchi; Hisayoshi Osumi, all of Hamamatsu (JP)

(73) Assignee: Yamaha Corporation (JP)

( * ) Notice: Subject to any disclaimer, the term of this patent is extended or adjusted under 35 U.S.C. 154(b) by 962 days.

(21) Appl. No.: 08/597,837

(22) Filed: Feb. 7, 1996

(30) Foreign Application Priority Data

Feb. 7, 1995 (JP) .............................................. 7-042452
Feb. 5, 1996 (JP) .............................................. 8-018669

(51) Int. Cl.$^7$ .................................................. C09J 5/10
(52) U.S. Cl. ...................... 156/306.9; 156/90; 156/312; 428/420; 428/537.1
(58) Field of Search ....................... 156/90, 312, 306.9; 428/420, 537.1

(56) References Cited

FOREIGN PATENT DOCUMENTS

| JP | 63-26699 | | 5/1988 | |
| JP | 63-162239 | * | 7/1988 | .............. 156/306.9 |

OTHER PUBLICATIONS

"Curved–Surface Sliced–Veneer–Veneered Board with Overlaid Film and Production Method Therefor", Japanese Patent Application, Second Publication (Kokoku), No. SHO 63–26699, published on May 31, 1988.

* cited by examiner

Primary Examiner—John J. Gallagher
(74) Attorney, Agent, or Firm—Dickstein Shapiro Morin & Oshinsky LLP

(57) ABSTRACT

A decorated article is disclosed which has a uniform color tone and which is excellent in heat resistance and humidity resistance which can be produced by preparing a base material, a surface of which is composed of an overlay, by injection molding or the like, the overlay having a wood material layer, a first side of the wood material layer constituting a surface of the overlay; providing a thermosetting coloring layer comprising at least one thermosetting resin, or a modified resin thereof, selected from the group of urethane resins, epoxy resins, amino-alkyd resins, and acrylic resins on the first side of the wood material layer; and laminating the surface of the thermosetting coloring layer with a thermoplastic resin sheet by a glue, and carrying out hot-pressing. The thermosetting coloring layer 15 may be formed by laminating a coloring layer 15A and a sealing layer 15B in that order.

11 Claims, 2 Drawing Sheets

PROCESS FOR PRODUCING DECORATED ARTICLE

BACKGROUND OF THE INVENTION

1. Field of the Invention

The present invention relates to a process for producing a decorated article. In particular, the present invention relates to a process for producing a decorated article in which the surface of a base material which is formed by injection molding or the like is laminated with a thermoplastic resin sheet.

2. Description of Related Art

Processes for producing overlay boards in which the surface thereof is laminated with a resin sheet or film have been hitherto proposed. For example, Japanese Patent Application, Second Publication (Kokoku), Sho 63-26699, discloses a process in which a thermoplastic resin film is put on the surface of a sliced veneer overlay board. According to this process, a hot-melt resin sheet having a melting point lower than that of the thermoplastic resin film is polymerized on the surface of a sliced veneer overlay board, and thereafter, the thermoplastic resin film is polymerized on the surface of the hot-melt resin sheet and pressuring is carried out at a predetermined temperature.

The above-mentioned proposed process has advantages in that a wood grain pattern is raised to the surface of the thermoplastic resin film while the thermoplastic resin film protects the sliced veneer overlay board from being soiled or the like.

However, the above process for producing an overlay board has a disadvantage in that the hot-melt resin sheet penetrates the sliced veneer overlay board, darkening the sliced veneer overlay board. Moreover, in a thermal cycle test (heat resistance test), it was discovered that delamination of the thermoplastic resin film occurs at 80° C., which limits the applicable range of this process. In addition, this process exhibited its defects in a dry-wet test (weathering test), according to which at a temperature of 50° C. and at a humidity of 95% RH, the appearance of the overlay board could not be maintained, as darkening in the surface worsens and dullness expands in some areas.

In addition, a conventional process for coating an injection molded article requires a great amount of time and incurs a high cost for carrying out the coating with a polyester, filling, sanding, and the like after primary molding. Moreover, this process has disadvantages in that it incurs an enormous cost for equipment to deal with environmental pollution which may be caused by the coating, which substantially increases production costs.

SUMMARY OF THE INVENTION

The present invention has been conceived taking the above disadvantages of the conventional arts into consideration; thus, the object of the present invention is to provide a process which makes it possible to manufacture a decorated article within a short time with simple equipment and which improves the heat resistance and the weather resistance of the decorated article, as well as the process to avoid penetration of glue into a base material, a surface of which is composed of an overlay, while maintaining a uniform color tone of the overlay.

In order to achieve the above object, the process for producing a decorated article according to the present invention employs a method in which a base material, a surface of which is composed of an overlay, is prepared by injection molding or the like, the overlay having a wood material layer, a first side of the wood material layer constituting a surface of the overlay; thereafter, a coloring layer is provided on the first side of the wood material layer; and the surface of the coloring layer is laminated with a thermoplastic resin sheet, and hot-pressing is carried out. In this process, a glue may be laid between the coloring layer and the thermoplastic resin sheet. A method in which a primer is additionally laid between the glue and the thermoplastic resin sheet is also applicable.

Moreover, the process for producing a decorated article according to the present invention may also employ a method in which a base material, a surface of which is composed of an overlay, is prepared by injection molding or the like, the overlay having a wood material layer, a first side of the wood material layer constituting a surface of the overlay; thereafter, the first side of the wood material layer being laminated with at least one coloring layer, which is formed by applying a colored thermosetting resin, and a sealing layer, which is composed of a colored or transparent thermosetting coating film, in that order; and the surface of the sealing layer is laminated with a transparent thermoplastic resin sheet, and hot-pressing is carried out. In this process, a glue may be laid between the sealing layer and the thermoplastic resin sheet. A method in which a primer is additionally laid between the glue and the thermoplastic resin sheet is also applicable.

The above-mentioned base material may be formed by: preparing the wood material layer; providing a metal layer on a second side of the wood material layer in a manner such that the second side of the wood material layer adheres to a first side of the metal layer; and providing a core material of the base material on a second side of the metal layer, the second side of the metal layer being opposite to the first side of the metal layer.

The above-mentioned coloring layer may be formed by applying a colored thermosetting resin containing at least one thermosetting resin, or a modified resin thereof, selected from the group consisting of urethane resins, epoxy resins, acrylic resins, and amino-alkyd resins, or by applying dye of pigment.

The above-mentioned sealing layer may be formed by applying a thermosetting resin containing at least one resin selected from the group consisting of urethane resins, epoxy resins, amino-alkyd resins, acrylic silicone resins, ultra-violet-cured urethane acrylate resins, ultra-violet-cured epoxy acrylate resins, ultra-violet-cured polyester acrylate resins, and ultra-violet-cured unsaturated polyester resins. The sealing layer may be colored or transparent.

As the above-mentioned thermoplastic resin sheet, a sheet containing at least one thermoplastic resin selected from the group consisting of fluorocarbon resins, acrylic resins, vinyl chloride resins, polycarbonate (PC) resins, acrylonitrile-butadiene-styrene (ABS) resins, acrylonitrile-styrene (AS) resins, polystyrene (PS) resins, polyethylene (PE) resins, and polypropylene (PP) resins may be employed.

According to the present invention, the formation of a thermosetting coloring layer on an overlay in a base material prevents the glue provided on the surface of the thermosetting coloring layer from penetrating into the overlay. Accordingly, a uniform wet appearance of the overlay is visible through the thermoplastic resin sheet which constitutes a surface layer in the end product while the heat resistance and the weather resistance are improved. In the case when a method in which a primer is laid between the glue and the thermoplastic resin sheet is employed, the thermoplastic resin sheet can be securely adhered.

In addition, in the case where a thermosetting coloring layer is formed with a lamination containing a coloring layer and a sealing layer in that order, the multi-layer structure of the coloring layer and sealing layer prevents the glue from penetrating even more effectively, and thus an even more uniform color tone of the colored overlay can be obtained. In addition, exudation of colorant from the coloring layer formed under the sealing layer can be prevented, as well as exudation of wood resin or the like contained in the wood material layer. Moreover, delamination of the thermoplastic resin sheet is prevented since residual functional groups (for example, isocyanate group —NCO in the case when a polyurethane resin is employed) in the thermosetting resin employed in the sealing layer react with the glue provided thereover so as to yield adhesion. Accordingly, heat resistance and weather resistance are even further improved. Moreover, since the thermoplastic resin is provided in a sheet-like film, the operation time can be reduced and the factory environment control equipment can be simplified. Furthermore, in the case when a method is employed in which a primer is additionally laid between the glue and the thermoplastic resin sheet, the thermoplastic resin sheet can be securely adhered.

According to the above-described construction of the present invention, a process for producing a decorated article can be provided which has superior advantages conventional processes did not have, making it possible to prevent penetration of the glue into the overlay as the surface layer in the base material so as to provide a uniform color tone of the overlay as well as improving the heat resistance and weather resistance.

DESCRIPTION OF THE PREFERRED EMBODIMENTS

Figure 1:
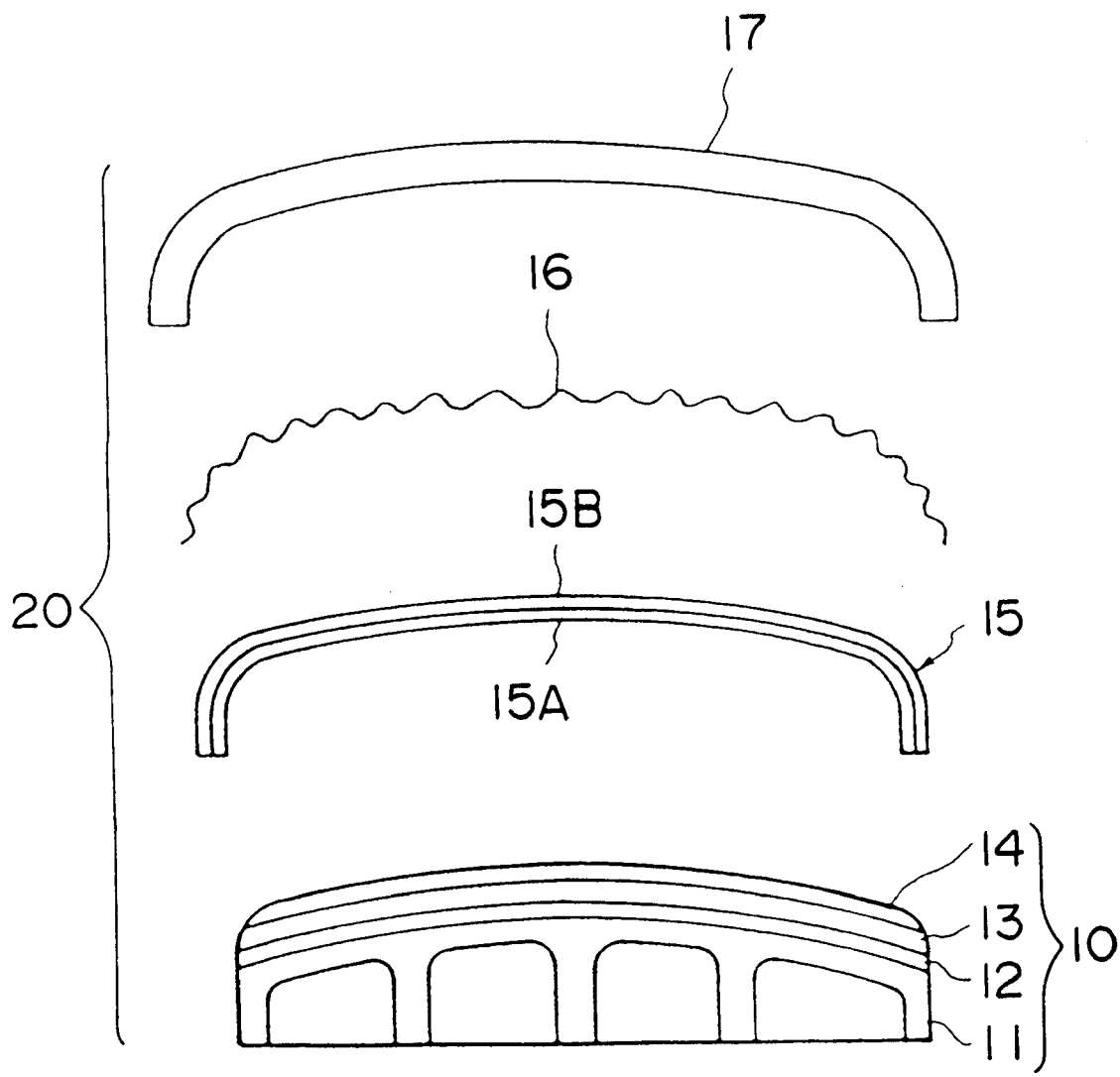
FIG. 1 is an exploded view of a decorated article produced according to an embodiment of the production process of the present invention.

According to the basic construction of this embodiment, as shown in FIG. 1, a base material 10 is constructed from a core material 11 which is formed from an ABS resin or the like by injection-molding or the like, containing a predetermined amount of glass materials; and an overlay, which is constructed from a veneer (rear portion material) 12 provided on the surface of the core material 11 and an overlay veneer (wood material layer) 14 which is laminated onto the veneer 12 via an aluminum sheet (metal layer) 13.

The wood material layer 14 may be formed of a wood veneer or a sliced veneer having an attractive grain pattern of a suitable thickness.

The metal layer 13 is optionally provided so as to strengthen the wood material layer 14; however, a structure without such a provision is also possible.

As for the metal layer 13, a thickness within a range of 0.05 to 0.5 mm is preferably employed; if the metal layer 13 is too thin, reinforcement of the wood material layer 14 may not be achieved, and if the metal layer 13 is too thick, the stiffness may be too great.

Furthermore, there is the option to provide a rear portion material 12 in order to enhance the handling of the overlay, and to improve the adhesion of the overlay, which is the front surface of the base material 10, and of the synthetic resin, which is used as a core material 11; a structure without such a provision is also possible.

For the rear portion material 12, a porous material such as a foam resin sheet or wood veneer, a non-woven fabric, or a fibrous material such as a glass fiber mat can be employed. For instance, when using a fibrous material, the weight per unit area is preferably within a range of 30 to 70 $g/m^2$.

When producing the overlay, a method is employed wherein the wood material layer 14, the metal layer 13, and the rear portion material 12 are laminated in order with a bonding agent therebetween and are affixed by applying heat and pressure, thus forming a unitary body.

According to the preferred embodiment, the overlay, which is constructed in a three-layer fashion, may be formed by laminating a walnut overlay veneer 14 into the front surface of a thin aluminum sheet 13, employing a cross-linking urethane dispersion bonding agent, and by laminating, in the same fashion, birch veneer 12 onto the rear surface, employing a cross-linking urethane dispersion bonding agent, thereby forming a unitary body. With regard to the bonding, the amount of bonding agent applied may be set at approximately 100 $g/m^2$, and bonding may be performed at a temperature of approximately 135° C. by applying a pressure of approximately 10 $kg/cm^2$ for a period of approximately 10 minutes.

Figure 2:
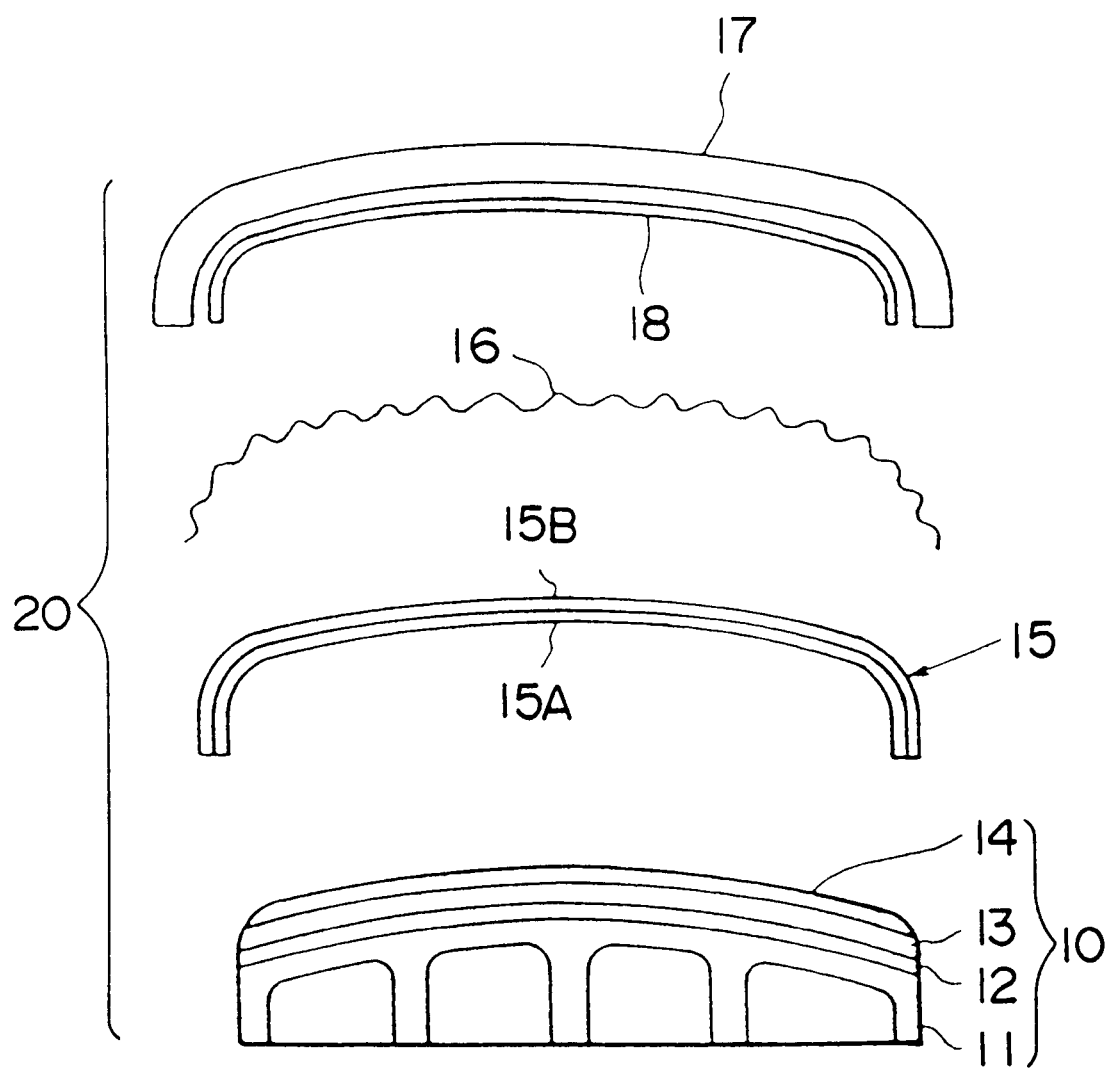
FIG. 2 is an exploded view of a decorated article produced according to another embodiment of the production process of the present invention.

On the surface of the overlay veneer 14, a coloring layer 15 is formed, and the surface of the thermosetting coloring layer 15 is laminated with a thermoplastic resin sheet 17 via a glue 16, according to which an end product 20 is obtained. In addition, as shown in FIG. 2, a primer 18 may be laid between the glue 16 and the thermoplastic resin sheet 17, according to which an end product is obtained in which the thermoplastic resin sheet 17 is securely adhered.

The coloring layer 15 according to this embodiment comprises a coloring layer 15A and a colored or transparent sealing layer 15B. The coloring layer 15A may be formed by applying a colored thermosetting resin containing at least one thermosetting resin selected from the group consisting of urethane resins, epoxy resins, acrylic resins, and amino-alkyd resins, or by applying dye or pigment. The sealing layer 15B contains at least one thermosetting resin selected from the group consisting of urethane resins, epoxy resins, amino-alkyd resins, acrylic silicone resins, ultra-violet-cured urethane acrylate resins, ultra-violet-cured epoxy acrylate resins, ultra-violet-cured polyester acrylate resins, and ultra-violet-cured unsaturated polyester resins. The coloring layer 15A and the sealing layer 15B constitute films in the end product 20. The coloring layer 15A includes a wiping coloring layer, filler coloring layer, and a wash coating coloring layer.

A wiping coloring layer is defined as a coloring layer formed by a method in which coloring is carried out by applying a colorant to a material using a brush or the like and then wiping off the colorant using a brush, a cotton waste, or the like.

A filler coloring layer is defined as a coloring layer formed for a material having large vessels by a method in which coating is carried out after regulating the surface condition of the material by rubbing a filler containing a large amount of extender into vessels. According to this method, since the surface of the material is made uniform, a thin coating film can be formed, and thereby the surface is smoothly finished.

A wash coating coloring layer is defined as a coloring layer formed, in the case when absorption of a colorant into a material is irregular or in the case when the surface of a material is very fuzzy, by a method using a paint containing a small amount of resin. According to this method, a paint is absorbed uniformly, and the removal of fuzz is facilitated. It is noted, however, that this method does not contribute very much to the formation of a coating film.

The thickness of a wiping coloring layer is preferably in the range of 0.1 to 5 µm. The thickness of a filler coloring layer is preferably in the range of 0.1 to 5 µm. The thickness of a wash coating coloring layer is preferably in the range of 2 to 30 µm.

An embodiment using a filler coloring material is explained furthermore in detail in the following.

A wood material layer 14 having large and deep vessels (e.g., Japanese oak, white ash, mahogany, etc.) in the upper portion of an overlay is colored by using a filler coloring material comprising urethane resin. In this embodiment using a filler coloring material made of a mixture of a colorant and an extender (such as talc, calcium carbonate, diatomaceous earth, or mica). The filler coloring material colors the wood material layer 14 as well as fills the vessels at the surface of the wood material layer 14. Subsequently, the surface of the filler coloring material is smoothed using sandpaper. The use of the filler coloring material to fill the vessels produces the following effects:

(a) The filler coloring material improves the appearance after the sealing layer 15B is provided over the filler coloring layer 15A, with a smooth and planar surface without depressions, since the filler coloring material fills the vessels; and (b) The filler coloring material prevents formation of spaces between the sealing layer 15B and the wood material layer 14 since depressions caused by vessels are filled with the filler coloring material. Otherwise, depressions remain, as the resin which forms the sealing layer 15B tends not to penetrate into large and deep vessels, and the depressions cause expansion of remaining air in the spaces during thermal cycle tests.

In the above, a colored sealing layer is a sealing layer containing colorant in the coating film, while a transparent sealing layer does not contain a colorant in the coating film and is thus transparent. In the case when a colored sealing layer is used, a deep color can be obtained since the combination of the coloring layer and the colored sealing layer can provide a complex color. The thickness of each of the coloring layer 15A and the sealing layer 15B is preferably between 5 and 50 µm. One or more coloring layers may be provided, and an arbitrary combination in the layered structure, which is laminated with a sealing layer 15B, may be employed.

As the glue 16, a hot-melt glue containing at least one hot-melt adhesive material selected from the group consisting of polyurethane-based materials, ethylene-vinyl acetate (EVA)-based materials, polyamide-based materials, and polyester-based materials can be employed as well as a thermosetting glue such as urethane and epoxy. The glue 16 may be applied with a thickness in a range of 10 to 1000 µm, and preferably in the range of 100 to 150 µm.

In general, a primer is defined as a layer inserted between a base layer to which resin poorly adheres, and a resin layer provided over the base layer for protecting it. Consequently, the primer adheres the base layer to the resin layer for protecting the base layer. The primer may be formed with a single constituent layer or plural constituent layers. In the present invention, as an example of a primer 18 to be provided between the glue 16 and the thermoplastic resin sheet 17, a polyester-based primer or the like may be cited.

As for the conditions for the production process, in the case when a hot-melt glue is employed, heating temperature is selected from a range of 100 to 160° C., while pressure to be applied is 0.1 to 5 MPa.

In addition, the thermoplastic resin sheet 17, which is to constitute a surface layer of the end product, contains at least one thermoplastic resin selected from the group consisting of fluorocarbon resins, acrylic resins, vinyl chloride resins, polycarbonate (PC) resins, acrylonitrile-butadiene-styrene (ABS) resins, acrylonitrile-styrene (AS) resins, polystyrene (PS) resins, polyethylene (PE) resins, and polypropylene (PP) resins, as well as other resin materials. The thickness of the thermoplastic resin sheet containing such a material is not limited according to the present invention; however, 0.1 to 5.0 mm is preferable in order to obtain substantial strength, appearance, and quality; a thickness in the range of 0.3 to 1.0 mm is more preferable. Since thermoplastic resin is provided in sheet, handling becomes easy.

In the following, more concrete examples of the present invention will be explained in comparison with comparative examples. Materials used in the coloring layer, the sealing layer, the glue, and the primer of each Example and each Comparative Example are shown in TABLE 1.

EXAMPLE 1

A base material 10 was prepared by laminating a core material 11, which was injection-molded from an ABS resin containing 20% by weight of glass material, with a veneer 12 having a thickness of 0.2 mm, an aluminum sheet 13 having a thickness of 0.2 mm, and a burled California walnut overlay veneer 14 having a thickness of 0.2 mm, in that order. The base material 10 was laminated with a wiping coloring layer 15A and a transparent sealing layer 15B, in that order, as a thermosetting coloring layer 15. A urethane-based resin (trade name: Wiping Base; manufactured by Washin Chemical Co., Ltd.) was used in both the wiping coloring layer 15A and the transparent sealing layer 15B. The thickness of the wiping coloring layer 15A was 2 µm, while the thickness of the transparent sealing layer 15B was 15 µm. A hot-melt glue (trade name: THERMORIGHT 6501; manufactured by Daicel Chemical Industries, Ltd.) was used as the glue 16 with a thickness of 100 µm. As the thermoplastic resin sheet 17 for the surface layer, an acrylic resin sheet with a thickness of 0.5 mm was employed. After the lamination of these layers, hot-pressing was carried out at a heating temperature of 130° C. under a pressure of 2.0 MPa, maintained for one minute, and thereafter, the temperature was lowered to near room temperature so as to obtain a decorated article 20.

The obtained decorated article 20 was subjected to thermal cycle tests A and B. and humidity resistance tests A and B. Thermal cycle test A was a test of 192 hours, in which four cycles were carried out; in each cycle, the decorated article 20 was cooled and maintained at −30° C. for 7.5 hours, left for 0.5 hours, heated and maintained at 80° C. for 15.5 hours, left for 0.5 hours, and again cooled and maintained at −30° C. for 7.5 hours, left for 0.5 hours, heated and maintained at 50° C. at 95% RH for 15.5 hours, and left for 0.5 hours. Thermal cycle test B was a test of 240 hours, in which ten cycles were carried out; in each of cycle, the decorated article 20 was cooled and maintained at −20° C. for 15.5 hours, left for 0.5 hours, heated and maintained at 50° C. for 7.5 hours, and left for 0.5 hours. Humidity resistance test A was carried out in which the decorated article 20 was maintained at 50° C. at 95% RH for 240 hours. In humidity resistance test B, two cycles were carried out in each of which the decorated article 20 was maintained at 35° C. at 95% RH for 48 hours and then at 35° C. at 20% RH for 120 hours. The results of each test and the appearance of each tested article are shown in TABLE 2.

EXAMPLE 2

In Example 2, a filler coloring layer having a thickness of 2 μm, a colored sealing layer having a thickness of 15 μm, and a transparent sealing layer having a thickness of 15 μm were laminated, in that order, to form a thermosetting coloring layer 15. A urethane-based resin (trade name: Polyure Wood Sealer; manufactured by Nippon Paint Co., Ltd.) was used in each coating layer. The colored sealing layer additionally contained 0.2% by weight of a colorant mixture (trade name: Spilon S-Liquid; manufactured by HODOGAYA CHEMICALS CO., LTD.) in the aforementioned Polyure Wood Sealer. The other conditions for the preparation were the same as those in Example 1. The test results obtained for the thus-obtained decorated article 20 are shown in TABLE 2.

EXAMPLE 3

In Example 3, a wiping coloring layer having a thickness of 2 μm, a colored sealing layer having a thickness of 15 μm, and a transparent sealing layer having a thickness of 15 μm were laminated, in that order, to form a thermosetting coloring layer 15. The material for each layer was a urethane-based material, which was the same as that used in Example 1. The other conditions for the preparation were the same as those in Example 1. The test results obtained for the thus-obtained decorated article 20 are shown in TABLE 2.

EXAMPLE 4

In Example 4, a wash coating coloring layer having a thickness of 5 μm, a filler coloring layer having a thickness of 2 μm, a colored sealing layer having a thickness of 15 μm, and a transparent sealing layer having a thickness of 15 μm were laminated, in that order, to form a thermosetting coloring layer 15. The material for each layer was a urethane-based material, which was the same as that used in Example 1. The other conditions for the preparation were the same as those in Example 1. The test results obtained for the thus-obtained decorated article 20 are shown in TABLE 2.

EXAMPLE 5

In Example 5, the same thermosetting coloring layer 15 as that used in Example 4 was employed. In addition, as the hot-melt glue 16, an EVA-based adhesive (trade name: 7500 EXP; manufactured by Hirodine Co., Ltd.) was employed with a thickness of 100 μm. The other conditions for the preparation were the same as those in Example 1. The test results obtained for the thus-obtained decorated article 20 are shown in TABLE 2.

EXAMPLE 6

In Example 6, the same thermosetting coloring layer 15 as that used in Example 4 was employed. In addition, as the hot-melt glue 16, a polyamide-based adhesive (trade name: Platilon H2; manufactured by Nippon Rilsan Co., Ltd.) was employed with a thickness of 100 μm. The other conditions for the preparation were the same as those in Example 1. The test results obtained for the thus-obtained decorated article 20 are shown in TABLE 2.

EXAMPLE 7

In Example 7, the same thermosetting coloring layer 15 as that used in Example 4 was employed. In addition, as the hot-melt glue 16, a polyester-based adhesive (a trial product named THERMORIGHT X; manufactured by Daicel Chemical Industries, Ltd.) was employed with a thickness of 100 μm. The other conditions for the preparation were the same as those in Example 1. The test results obtained for the thus-obtained decorated article 20 are shown in TABLE 2.

EXAMPLE 8

In Example 8, a urethane-based wash coating coloring layer having a thickness of 2 μm, a urethane-based filler coloring layer having a thickness of 2 μm, an epoxy-based colored sealing layer having a thickness of 20 μm, and an epoxy-based transparent sealing layer having a thickness of 30 μm were laminated, in that order, to form a thermosetting coloring layer 15. The material for each urethane-based coating film layer was the same as that used in Example 1. The material for each epoxy-based coating film layer was a trial product A manufactured by Nippon Oil & Fats Co., Ltd. As the hot-melt glue 16, the aforementioned THERMORIGHT 6501 was employed with a thickness of 100 μm. The other conditions for the preparation were the same as those in Example 1. The test results obtained for the thus-obtained decorated article 20 are shown in TABLE 2.

EXAMPLE 9

In Example 9, the same thermosetting coloring layer 15 as that used in Example 8 was employed. As the hot-melt glue 16, the aforementioned EVA-based adhesive, 7500 EXP, was employed with a thickness of 100 μm. The other conditions for the preparation were the same as those in Example 1. The test results obtained for the thus-obtained decorated article 20 are shown in TABLE 2.

EXAMPLE 10

In Example 10, the same thermosetting coloring layer 15 as that used in Example 8 was employed. As the hot-melt glue 16, the aforementioned polyamide-based adhesive, Platilon H2, was employed with a thickness of 100 μm. The other conditions for the preparation were the same as those in Example 1. The test results obtained for the thus-obtained decorated article 20 are shown in TABLE 2.

EXAMPLE 11

In Example 11, the same thermosetting coloring layer 15 as that used in Example 8 was employed. As the hot-melt glue 16, the aforementioned polyester-based adhesive, THERMORIGHT X, was employed with a thickness of 100 μm. The other conditions for the preparation were the same as those in Example 1. The test results obtained for the thus-obtained decorated article 20 are shown in TABLE 2.

EXAMPLE 12

In Example 12, a urethane-based wash coating coloring layer having a thickness of 5 μm, a urethane-based filler coloring layer having a thickness of 2 μm, an amino-alkyd-based colored sealing layer having a thickness of 20 μm, and an amino-alkyd-based transparent sealing layer having a thickness of 30 μm were laminated, in that order, to form a thermosetting coloring layer 15. The material for each urethane-based coating film layer was the same as that used in Example 1. The material for each amino-alkyd-based coating film layer was an Amino alkyd Sealer manufactured by Washin Chemical Co., Ltd. As the hot-melt glue 16, the aforementioned THERMORIGHT 6501 was employed with a thickness of 100 μm. The other conditions for the prepa-

EXAMPLE 13

In Example 13, the same thermosetting coloring layer 15 as that used in Example 12 was employed. As the hot-melt glue 16, the aforementioned EVA-based adhesive, 7500 EXP, was employed with a thickness of 100 µm. The other conditions for the preparation were the same as those in Example 1. The test results obtained for the thus-obtained decorated article 20 are shown in TABLE 2.

EXAMPLE 14

In Example 14, the same thermosetting coloring layer 15 as that used in Example 12 was employed. As the hot-melt glue 16, the aforementioned polyamide-based adhesive, Platilon H2, was employed with a thickness of 100 µm. The other conditions for the preparation were the same as those in Example 1. The test results obtained for the thus-obtained decorated article 20 are shown in TABLE 2.

EXAMPLE 15

In Example 15, the same thermosetting coloring layer 15 as that used in Example 12 was employed. As the hot-melt glue 16, the aforementioned polyester-based adhesive, THERMORIGHT X, was employed with a thickness of 100 µm. The other conditions for the preparation were the same as those in Example 1. The test results obtained for the thus-obtained decorated article 20 are shown in TABLE 2.

EXAMPLE 16

In Example 16, a wiping coloring layer having a thickness of 2 µm, a colored sealing layer having a thickness of 15 µm, and a transparent sealing layer having a thickness of 15 µm were laminated, in that order, to form a thermosetting coloring layer 15. The material for each layer was a urethane-based material, which was the same as that used in Example 1. As the glue 16, a urethane-based adhesive was employed. The heating temperature was set at 50° C., and the applied pressure was set at 2 MPa. The test results obtained for the thus-obtained decorated article 20 are shown in TABLE 2.

EXAMPLE 17

In Example 17, the same thermosetting coloring layer 15 as that used in Example 16 was employed. As the glue 16, an epoxy-based adhesive was employed. The other conditions for the preparation were the same as those in Example 16. The test results obtained for the thus-obtained decorated article 20 are shown in TABLE 2.

EXAMPLE 18

In Example 18, a wiping coloring layer having a thickness of 2 µm, a colored sealing layer having a thickness of 20 µm, and a transparent sealing layer having a thickness of 30 µm were laminated, in that order, to form a thermosetting coloring layer 15. The material for each layer was an epoxy-based material, which was the same as that used in Example 8. As the glue 16, a urethane-based adhesive was employed. The heating temperature and the applied pressure were the same as those in Example 16. The test results obtained for the thus-obtained decorated article 20 are shown in TABLE 2.

EXAMPLE 19

In Example 19, the same thermosetting coloring layer 15 as that used in Example 18 was employed. As the glue 16, an epoxy-based adhesive was employed. The other conditions for the preparation were the same as those in Example 18. The test results obtained for the thus-obtained decorated article 20 are shown in TABLE 2.

EXAMPLE 20

In Example 20, a wiping coloring layer having a thickness of 2 µm, a colored sealing layer having a thickness of 20 µm, and a transparent sealing layer having a thickness of 30 µm were laminated, in that order, to form a thermosetting coloring layer 15. The material for each layer was an amino-alkyd-based material, which was the same as that used in Example 12. As the glue 16, a urethane-based adhesive was employed. The other conditions for the preparation were the same as those in Example 16. The test results obtained for the thus-obtained decorated article 20 are shown in TABLE 2.

EXAMPLE 21

In Example 21, the same thermosetting coloring layer 15 as that used in Example 20 was employed. AS the glue 16, an epoxy-based adhesive was employed. The other conditions for the preparation were the same as those in Example 16. The test results obtained for the thus-obtained decorated article 20 are shown in TABLE 2.

EXAMPLE 22

Example 22 was the same as Example 4, except that a primer 18 (a polyester-based primer manufactured by Dainippon Ink and Chemicals, Inc.) was additionally employed in order to enhance the adhesion of the thermoplastic resin sheet 17. The test results obtained for the thus-obtained decorated article 20 are shown in TABLE 2.

EXAMPLE 23

Example 23 was the same as Example 5, except that a primer 18 (a polyester-based primer manufactured by Dainippon Ink and Chemicals, Inc.) was additionally employed in order to enhance the adhesion of the thermoplastic resin sheet 17. The test results obtained for the thus-obtained decorated article 20 are shown in TABLE 2.

EXAMPLE 24

Example 24 was the same as Example 8, except that a primer 18 (a polyester-based primer manufactured by Dainippon Ink and Chemicals, Inc.) was additionally employed in order to enhance the adhesion of the thermoplastic resin sheet 17. The test results obtained for the thus-obtained decorated article 20 are shown in TABLE 2.

EXAMPLE 25

Example 25 was the same as Example 9, except that a primer 18 (a polyester-based primer manufactured by Dainippon Ink and Chemicals, Inc.) was additionally employed in order to enhance the adhesion of the thermoplastic resin sheet 17. The test results obtained for the thus-obtained decorated article 20 are shown in TABLE 2.

EXAMPLE 26

Example 26 was the same as Example 12, except that a primer 18 (a polyester-based primer manufactured by Dainippon Ink and Chemicals, Inc.) was additionally employed in order to enhance the adhesion of the thermoplastic resin sheet 17. The test results obtained for the thus-obtained decorated article 20 are shown in TABLE 2.

EXAMPLE 27

Example 27 was the same as Example 13, except that a primer 18 (a polyester-based primer manufactured by Dainippon Ink and Chemicals, Inc.) was additionally employed in order to enhance the adhesion of the thermoplastic resin sheet 17. The test results obtained for the thus-obtained decorated article 20 are shown in TABLE 2.

Comparative Example 1

In Comparative Example 1, neither a coloring layer nor a sealing layer was provided, and a hot-melt glue was directly provided on a base material. The glue was the aforementioned THERMORIGHT 6501 with a thickness of 100 μm. The other conditions for the preparation such as the heating temperature and the applied pressure were the same as those in Example 1. The test results obtained for the thus-obtained article are shown in TABLE 2.

Comparative Example 2

In Comparative Example 2, a urethane-based wiping coloring with a thickness of 2 μm was provided on the surface of a base material. The other conditions for the preparation such as the heating temperature and the applied pressure were the same as those in Comparative Example 1. The test results obtained for the thus-obtained article are shown in TABLE 2.

Comparative Example 3

In Comparative Example 3, no thermosetting coloring layer was provided, and a urethane-based adhesive was employed as a glue. The heating temperature was 50° C., and the applied pressure was 2.0 MPa. The test results obtained for the thus-obtained article are shown in TABLE 2.

Comparative Example 4

In Comparative Example 4, coloring was carried out in the same manner as that in Comparative Example 2. The other conditions for the preparation were the same as those in Comparative Example 3. The test results obtained for the thus-obtained article are shown in TABLE 2.

Comparative Example 5

In Comparative Example 5, no thermosetting coloring layer was provided, and an epoxy-based adhesive was employed as a glue. The heating temperature and the applied pressure were the same as those in Comparative Example 3. The test results obtained for the thus-obtained article are shown in TABLE 2.

Comparative Example 6

In Comparative Example 6, coloring was carried out in the same manner as that in Comparative Example 2. An epoxy-based adhesive was employed as a glue. The heating temperature and the applied pressure were the same as those in Comparative Example 3. The test results obtained for the thus-obtained article are shown in TABLE 2.

As may be seen from an examination of the data in TABLE 2, samples provided through Comparative Examples 1–6 show insufficient property; on the contrary, it is clear that the decorated articles obtained in accordance with Examples of the production method of the present invention exhibit excellent results in the thermal cycle tests and the humidity resistance tests as well as in appearance, in comparison with the articles obtained in the Comparative Examples.

It is noted that although the base materials were formed by injection molding in Examples, the method for producing a decorated article of the present invention is not particularly limited to that using an injection-molded base material.

In addition, although the invention has been described in detail herein with reference to its preferred embodiments and certain described alternatives, it is to be understood that this description is by way of example only, and it is not to be construed in a limiting sense. It is further understood that numerous changes in the details of the embodiments of the invention, and additional embodiments of the invention, will be apparent to, and may be made by persons of ordinary skill in the art having reference to this description. It is contemplated that all such changes and additional embodiments are within the spirit and true scope of the invention as claimed below.

TABLE 1

| | Wiping coloring layer | Wash coating coloring layer | Filler coloring layer | Colored sealing | Transparent sealing | Glue | Primer |
|---|---|---|---|---|---|---|---|
| Example 1 | urethane | — | — | — | urethane | hot-melt (polyurethane) | — |
| Example 2 | — | — | urethane | urethane | urethane | hot-melt (polyurethane) | — |
| Example 3 | urethane | — | — | urethane | urethane | hot-melt (polyurethane) | — |
| Example 4 | — | urethane | urethane | urethane | urethane | hot-melt (polyurethane) | — |
| Example 5 | — | urethane | urethane | urethane | urethane | hot-melt (EVA) | — |
| Example 6 | — | urethane | urethane | urethane | urethane | hot-melt (polyamide) | — |
| Example 7 | — | urethane | urethane | urethane | urethane | hot-melt (polyester) | — |
| Example 8 | — | urethane | urethane | epoxy | epoxy | hot-melt (polyurethane) | — |
| Example 9 | — | urethane | urethane | epoxy | epoxy | hot-melt (EVA) | — |
| Example 10 | — | urethane | urethane | epoxy | epoxy | hot-melt (polyamide) | — |
| Example 11 | — | urethane | urethane | epoxy | epoxy | hot-melt (polyester) | — |
| Example 12 | — | urethane | urethane | amino-alkyd | amino-alkyd | hot-melt (polyurethane) | — |
| Example 13 | — | urethane | urethane | amino-alkyd | amino-alkyd | hot-melt (EVA) | — |
| Example 14 | — | urethane | urethane | amino-alkyd | amino-alkyd | hot-melt (polyamide) | — |
| Example 15 | — | urethane | urethane | amino-alkyd | amino-alkyd | hot-melt (polyester) | — |
| Example 16 | urethane | — | — | urethane | urethane | urethane | — |

TABLE 1-continued

| | Wiping coloring layer | Wash coating coloring layer | Filler coloring layer | Colored sealing | Transparent sealing | Glue | Primer |
|---|---|---|---|---|---|---|---|
| Example 17 | urethane | — | — | urethane | urethane | epoxy | — |
| Example 18 | epoxy | — | — | epoxy | epoxy | urethane | — |
| Example 19 | epoxy | — | — | epoxy | epoxy | epoxy | — |
| Example 20 | aminoalkyd | — | — | aminoalkyd | aminoalkyd | urethane | — |
| Example 21 | aminoalkyd | — | — | aminoalkyd | aminoalkyd | epoxy | — |
| Example 22 | — | urethane | urethane | urethane | urethane | hot-melt (polyurethane) | used |
| Example 23 | — | urethane | urethane | urethane | urethane | hot-melt (EVA) | used |
| Example 24 | — | urethane | urethane | epoxy | epoxy | hot-melt (polyurethane) | used |
| Example 25 | — | urethane | urethane | epoxy | epoxy | hot-melt (EVA) | used |
| Example 26 | — | urethane | urethane | aminoalkyd | aminoalkyd | hot-melt (polyurethane) | used |
| Example 27 | — | urethane | urethane | aminoalkyd | aminoalkyd | hot-melt (EVA) | used |
| Comp. Example 1 | — | — | — | — | — | hot-melt (polyurethane) | — |
| Comp. Example 2 | urethane | — | — | — | — | hot-melt (polyurethane) | — |
| Comp. Example 3 | — | — | — | — | — | urethane | — |
| Comp. Example 4 | urethane | — | — | — | — | urethane | — |
| Comp. Example 5 | — | — | — | — | — | epoxy | — |
| Comp. Example 6 | urethane | — | — | — | — | epoxy | — |

TABLE 2

| | Test | | | | |
|---|---|---|---|---|---|
| | Thermal cycle A | Thermal cycle B | Humidity resistance A | Humidity resistance B | Appearance |
| Example 1 | good | good | excellent | excellent | excellent |
| Example 2 | good | good | excellent | excellent | excellent |
| Example 3 | good | good | excellent | excellent | excellent |
| Example 4 | excellent | excellent | excellent | excellent | excellent |
| Example 5 | excellent | excellent | excellent | excellent | excellent |
| Example 6 | excellent | excellent | excellent | excellent | excellent |
| Example 7 | excellent | excellent | excellent | excellent | excellent |
| Example 8 | excellent | excellent | excellent | excellent | excellent |
| Example 9 | excellent | excellent | excellent | excellent | excellent |
| Example 10 | excellent | excellent | excellent | excellent | excellent |
| Example 11 | excellent | excellent | excellent | excellent | excellent |
| Example 12 | excellent | excellent | excellent | excellent | excellent |
| Example 13 | excellent | excellent | excellent | excellent | excellent |
| Example 14 | excellent | excellent | excellent | excellent | excellent |
| Example 15 | excellent | excellent | excellent | excellent | good |
| Example 16 | excellent | excellent | good | good | good |
| Example 17 | excellent | excellent | good | good | good |
| Example 18 | excellent | excellent | good | good | good |
| Example 19 | excellent | excellent | good | good | good |
| Example 20 | excellent | excellent | good | good | good |
| Example 21 | excellent | excellent | good | good | good |
| Example 22 | excellent | excellent | excellent | excellent | excellent |
| Example 23 | excellent | excellent | excellent | excellent | excellent |
| Example 24 | excellent | excellent | excellent | excellent | excellent |
| Example 25 | excellent | excellent | excellent | excellent | excellent |
| Example 26 | excellent | excellent | excellent | excellent | excellent |
| Example 27 | excellent | excellent | excellent | excellent | excellent |
| Comp. Example 1 | — | good | — | good | change in color tone |
| Comp. Example 2 | — | — | — | — | poor |
| Comp. Example 3 | good | good | poor | good | change in color tone |
| Comp. Example 4 | good | good | — | poor | good |
| Comp. Example 5 | good | good | — | good | change in color tone |
| Comp. Example 6 | good | good | — | good | good |

What is claimed is:

1. A process for producing a decorated article, comprising the steps of:
   (a) preparing a base material, a surface of which is composed of an overlay, the overlay having a wood material layer, a first side of the wood material layer constituting a surface of the overlay;
   (b) providing a thermosetting coloring layer on the first side of the wood material layer, the thermosetting coloring layer having a coloring layer formed by applying a colored thermosetting resin; and
   (c) providing a surface layer on the thermosetting coloring layer by hot-pressing a thermoplastic resin sheet on the thermosetting coloring layer.

2. A process for producing a decorated article according to claim 1, wherein step (b) comprises the steps of:
   (b-1) providing the coloring layer on the first side of the wood material layer by applying a colored thermosetting resin; and
   (b-2) providing a sealing layer on the coloring layer.

3. A process for producing a decorated article according to claim 2, wherein the sealing layer provided in step (b-2) contains at least one thermosetting resin selected from the group consisting of urethane resins, epoxy resins, aminoalkyd resins, acrylic silicone resins, ultra-violet-cured urethane acrylate resins, ultra-violet-cured epoxy acrylate resins, ultra-violet-cured polyester acrylate resins, and ultra-violet-cured unsaturated polyester resins.

4. A process for producing a decorated article according to claim 2, wherein the sealing layer provided in step (b-2) has a thickness in a range of 5 to 50 μm.

5. A process for producing a decorated article according to claim 1, wherein step (b) further comprises the step of:

(b-3) applying a glue to a surface of the thermosetting coloring layer prior to providing the surface layer;

wherein the glue is a hot-melt glue containing at least one hot-melt adhesive material selected from the group consisting of polyurethane-based materials, ethylene-vinyl acetate-based materials, polyamide-based materials, and polyester-based materials.

6. A process for producing a decorated article according to claim 5, wherein in step (b-3) the glue is applied with a thickness in a range of 10 to 1000 μm.

7. A process for producing a decorated article according to claim 1, wherein step (a) comprises the steps of:

(a-1) preparing the wood material layer;

(a-2) providing a metal layer on a second side of the wood material layer in a manner such that the second side of the wood material layer adheres to a first side of the metal layer; and (a-3) providing a core material of the base material on a second side of the metal layer, the second side of the metal layer being opposite to the first side of the metal layer.

8. A process for producing a decorated article according to claim 1, wherein in step (b) the coloring layer is formed by applying a colored thermosetting resin containing at least one thermosetting resin selected from the group consisting of urethane resins, epoxy resins, acrylic resins, and amino-alkyd resins.

9. A process for producing a decorated article according to claim 1, wherein the thermoplastic resin sheet to be hot-pressed in step (c) contains at least one thermoplastic resin selected from the group consisting of fluorocarbon resins, acrylic resins, vinyl chloride resins, polycarbonate resins, acrylonitrile-butadiene-styrene resins, acrylonitrile-styrene resins, polystyrene resins, polyethylene resins, and polypropylene resins.

10. A process for producing a decorated article according to claim 1, wherein the hot-pressing in step (c) is carried out at a pressure in a range of 0.1 to 5 MPa and at a temperature in a range of 20 to 160° C.

11. A process for producing a decorated article, comprising the steps of:

(a) preparing a base material, a surface of which is composed of an overlay, the overlay having a wood material layer, a first side of the wood material layer constituting a surface of the overlay;

(b) providing a thermosetting coloring layer on the first side of the wood material layer, the thermosetting coloring layer having a laminated structure of a coloring layer containing a colored thermosetting resin and a sealing layer provided on the coloring layer, the coloring layer adhering to the first surface of the wood material layer; and (c) providing a surface layer on the thermosetting coloring layer by hot-pressing a thermoplastic resin sheet on the thermosetting coloring layer.

* * * * *